GATEABLE BRIDGE NETWORK HAVING POWER GAIN

Filed Feb. 17, 1964 3 Sheets-Sheet 1

INVENTOR.
RICHARD H. BAKER
BY

Richard F. Benway
ATTORNEY

GATEABLE BRIDGE NETWORK HAVING POWER GAIN

Filed Feb. 17, 1964

3 Sheets-Sheet 2

INVENTOR.

RICHARD H. BAKER

BY

Richard F. Benway

ATTORNEY

INVENTOR.
RICHARD H. BAKER
BY
Richard F. Benway
ATTORNEY

United States Patent Office 3,302,039
Patented Jan. 31, 1967

3,302,039
GATEABLE BRIDGE NETWORK HAVING POWER GAIN

Richard H. Baker, Bedford, Mass., assignor to Massachusetts Institute of Technology, Cambridge, Mass., a corporation of Massachusetts Filed Feb. 17, 1964, Ser. No. 345,469
5 Claims. (Cl. 307—88.5)

The present invention relates to bridge networks, and more particularly to bridge networks employing gain-producing elements to provide systems which perform both analog and digital functions.

Analog techniques, on the one hand, are superior to digital techniques in that such systems are much more easily synthesized. The foregoing is particularly true in real time processing. Digital techniques, on the other hand, offer the advantages of reliability, simplicity of circuit design, and provide a building block approach to system design.

The present invention provides a circuit having some of the advantages of both digital and analog techniques, such as the use of continuously variable threshold levels in analog operation. This mode of operation is often desirable in signal detection in order to avoid the necessity for quantizing the signal and to avoid the complexity inherent in the analog to digital conversion process.

Networks according to the invention are also well adapted to use with the discrete threshold levels of digital circuitry and thus permit the building block approach to system synthesis. The provision of both analog and digital functions permits my networks to perform digital to analog or analog to digital conversions with a minimum of system complexity. Input-output isolation and adaptability to clock pulse control are provided by my invention with both the analog and digital functions. Therefore, advantages of the digital building block system approach can be utilized in systems which function in an analog manner. The reduction in system complexity permits power consumption to be held to a minimum so that systems incorporating my invention are well adapted for use in space or other remote locations.

In general, my invention is characterized by a novel gain-producing bridge network capable of effective operation in floating or above-ground condition while providing substantial power gain in accurately transferring the input signal to the output. This makes possible simple but accurate systems operating in analog or digital modes depending on the particular function desired. By way of example, circuits utilizing the present invention may provide a highly effective isolation amplifier; a function generator (D.-C. or A.-C. amplifier with or without feedback or a ladder); a linear slope generator; delay and storage circuits; digital-to-analog converters; analog-to-digital converters; and simple but effective adder, subtractor, multiplier, and divider circuits. Furthermore, systems using the present invention permit a marked reduction in complexity and power consumption, while providing excellent stability.

In accordance with the foregoing, my invention has as an object the provision of a novel gain-producing isolation and control circuit which makes possible the provision of a wide variety of systems having analog and digital functions.

Another object is to provide reliable high-speed circuit modules.

Another object is the provision of easily fabricated digital and analog systems which have low power consumption.

A further object is to provide interchangeable circuit modules performing analog or digital functions.

Still another object is the provision of circuit modules which permit a building-block approach to the design of analog systems.

A still further object is the provision of detection and transfer circuits with adjustable threshold levels.

Still another object is the provision of reliable transfer circuits which shift the input voltage in predetermined voltage increments.

Other objects and features will appear from the following description, taken in connection with the accompanying drawings in which:

FIGURE 4 shows symbolic representations of the various sub-system configurations wherein:

FIGURE 5 illustrates numerous applications of the various sub-systems depicted in FIGURE 4 where representative functions are performed as follows:

Figure 1:
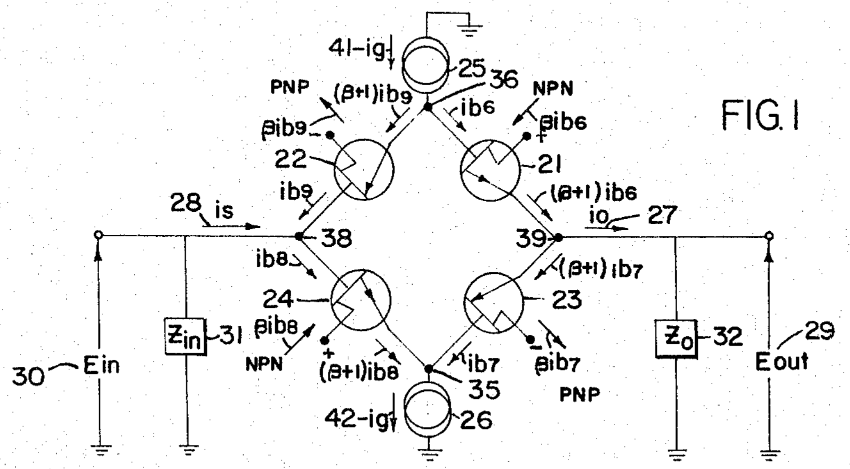
FIGURE 1 shows the basic circuit configuration.

The basic circuit configuration, illustrated in FIG. 1, is characterized by a four terminal bridge or diamond configuration wherein the arms include transistors or other gain-producing elements. Moreover, a control current is applied to terminals other than the input and output terminals. This control current may be pulsed or continuous and controls the transfer of the signal from input to output and the control current is applied in such a manner that the bridge effectively "floats" above ground. The bridge therefore provides controlled sampling with power gain. The use of transistors results in a mode of operation different from that of conventional bridge circuits.

The basic bridge configuration will first be described. Four nodes 35, 36, 38, 39 to which four transistors are interconnected form the legs of the bridge. The bases of transistors 22 and 24 are connected to input node 38. The emitters of transistors 21 and 23 are connected to output node 39. The base of transistor 21 and the emitter of transistor 22 are connected to node 36, and the base of transistor 23 and emitter of transistor 24 are connected to node 35.

Current $i_s$28 is the current that flows from the input source into the bridge circuit at node 38 and correspondingly, $i_o$27 is the output current that flows from the bridge circuit at node 39. Current $i_g$41 generated at current source 25 flows into the bridge at node 36. Current $i_g$42 generated at current source 26 flows out of the bridge circuit at node 35.

Currents $i_b$6, 7, 8 and 9 are those which flow within the bridge and are related to signal source current $i_s$28, the load current $i_o$27, and both $i_g$41 and $i_g$42 which are generated by the current sources 25 and 26. $i_b$6, 7, 8 and 9 are collector currents that enter or leave the circuit, depending upon the indicated polarity at the collectors of the transistors.

Assume an input signal $E_{in}$30 applied by way of input impedance $Z_{in}$31 at node 38 and that current generators 25 and 26 are off. Then $i_b$ in the leg containing transistor 22 and the leg containing transistor 24 will be zero, for the current sources 25 and 26 block the path to ground in these respective branches of the circuit. Further tracing of the circuit shows that the current is blocked by means of transistors 22 and 23 in the paths to ground by way of load impedance $Z_o$32.

When current sources 25 and 26 are turned on, currents $i_g$41 and $i_g$42 will flow into and out of the circuit respectively. As will be explained more fully, $E_{in}$30 is effectively transferred to the output side and appears as $E_{out}$ 29. $E_{in}$30 and $E_{out}$29 differ by some small quantity due to the uncertainty of the components which for the most part can be ignored. This difference may be negative or positive and, when several units are coupled together, differences tend to cancel.

To continue in this analysis, assume that $E_{in}$30 is continuously applied to the circuit and that current sources 25 and 26 are switched on for a short period of time. $E_{in}$30 appears across the bridge arms including transistors 22 and 21 and bridge arms including transistors 24 and 23 from node 38 to ground through node 39 and load impedance $Z_o$32. Assume the polarity of $E_{in}$30 holds transistor 22 off and transistor 24 on. Consequently, $i_s$28 is related directly to $i_g$42 by way of the amplification factor of transistor 24. It will be shown that $$\frac{i_s28}{\beta} \cong i_g42$$

where $\beta$ is the amplification factor of the transistor.

During transistion (i.e. while $E_{in}$ is transferred to $E_{out}$) $E_{out}29 < E_{in}30$; therefore, voltage at node 36 is greater than at node 39; consequently transistor 21 is held in a conducting state, while voltage at node 35 is greater than the voltage at node 39; consequently transistor 23 is held off. It will be shown that $\beta i_g41 \cong i_o27$.

The above process continues until the output voltage $E_{out}$29 approximately equals the input voltage $E_{in}$, that is, the legs of the bridge assume a balanced condition. When $Z_o$32 is a capacitor, it charges to the input voltage by means of current $i_g$41. If $E_{out}$29 exceeds $E_{in}$30, transistors 22 and 23 are biased to conduct and transistors 21 and 24 are cut off to restore a balanced condition.

$E_{in} \cong E_{out}$ when the current generators 25 and 26 are switched on, indicating a unity voltage gain. The output circuit is completely isolated from the input circuit when $i_g$41 and 42 are not flowing; as a result, $i_g$41 and 42 act as a control gate on the signal transfer from input to output.

During signal transference, transistors 22 and 23 are cut off. As a consequence, the following relationships apply:

At node 38; $i_g28 = i_b8$ for $i_b9 = 0$

At transistor 24: $i_b$8 flows into the base, and $\beta i_b$8 flows into the collector; therefore $(\beta+1)i_b8$ flows out of the emitter.

At node 35 then; $(\beta+1)i_b8 = i_g42$ for $i_b7 = 0$

Substituting $i_s$ 28 for $i_b$8; $(\beta+1)i_s28 = i_g42$

Also at node 36; $i_g41 = i_b6$ for $i_b9 = 0$

At transistor 21: $i_b$6 flows into the base, and $\beta i_b$6 flows into the collector; therefore $(\beta+1)i_b6$ flows out of the emitter.

At node 39: $(\beta+1)i_b6 = i_o27$ for $i_b7 = 0$

Substituting $i_g$41 for 6; $(\beta+1)i_g41 = i_o27$, and $$i_g41 = \frac{i_o27}{\beta+1}$$

$i_g41 = i_g42$, therefore:

$$(\beta+1)i_s = \frac{i_o27}{\beta+1}$$

and $i_o27 = (\beta+1)^2 i_s28$, or if $\beta$ is much greater than one $i_o = \beta^2 i_s$, current gain for the overall circuit is $\beta^2$.

Three fundamental differences between the present invention and the conventional bridge are now apparent. These differences are the use of active elements in the bridge, the symmetrical current sources 25 and 26, and the overall current gain of the circuit.

It will be further noted that if the polarity of $E_{in}$30 is reversed, transistors 22 and 23 will be switched on while 21 and 24 are held off, but the overall operation remains the same. Furthermore, transistors 22 and 23 are shown as PNP type transistors while transistors 24 and 21 are shown as NPN. The circuit could be reversed, making transistors 24 and 21 PNP types and transistors 22 and 23 NPN types without detracting from the effective operation of the circuit.

Two current generators 25 and 26 are shown. Their midpoint is grounded resulting in symmetrical currents. Alternatively, a single ungrounded current source between nodes 36 and 35 may be utilized. In any event, the current source contemplated must have at least a plus or minus one percent regulation; that is, a relatively constant current source is needed.

Figure 2:
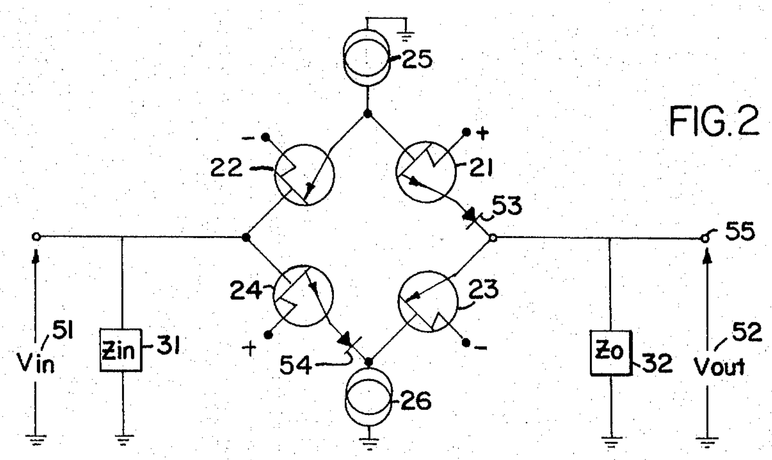
FIGURE 2 shows the basic circuit with provision for the insertion of an offset voltage in the output voltage.

Referring to FIGURE 2, a slight modification of the circuit shown in FIGURE 1 is illustrated. This circuit offsets the output voltage with respect to the input so as to provide a predetermined difference between output and input voltage.

Rectifier 53 in the leg containing transistor 21 together with rectifier 54 in the leg containing transistor 24 raises the voltage of the output V52 such that $$V_{in}51 + V_{offset} = V_{out}52$$

where $V_{offset}$ is the desired voltage offset introduced by means of rectifiers 53 and 54.

The above is one method by which an offset can be introduced. A voltage offset may also be provided by applying a fixed potential at the output terminal 55 such that the output voltage 52 is the sum of the voltage produced by the transistor bridge network and the fixed potential. Obviously, the output voltage can be raised or lowered with respect to the input. In other words, negative as well as positive offset can be introduced.

Figure 3:
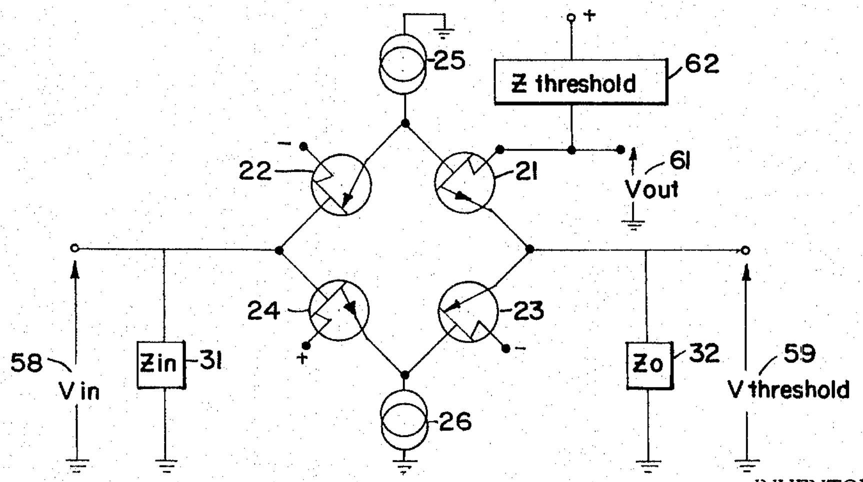
FIGURE 3 shows the basic circuit with provisions for the establishment of a threshold voltage.

Referring to FIGURE 3, it will be observed that an impedance has been inserted in the collector circuit. With a voltage threshold applied to the output terminal 59, transistor 21 will remain off until $V_{in}$58 exceeds this voltage. When $V_{in}$58 becomes greater than V59, current flows in the collector circuit of transistor 21 and a voltage $V_{out}$61 develops across impedance Z62. It will be further noted that a negative threshold will be established by the insertion of an impedance in the collector circuit of transistor 23 and an appropriate threshold voltage applied at 59.

The foregoing has been directed to networks wherein the four legs of a network are transistors. While the use of transistors or other solid-state amplifiers in each leg is preferred, certain substitutions can be made in the legs. If the two opposing transistors are replaced with diodes, input signals will be power amplified in only one direction either positively or negatively depending upon which group of transistors is replaced. If adjacent transistors are replaced by two diodes then the amplification factor of the bridge will be reduced to $\beta$. If other passive elements are used in place of diodes, isolation is sacrificed.

FIGURES 1, 2 and 3 represent three basic building blocks: a straight through network illustrated in FIGURE 1, an offset voltage circuit illustrated in FIGURE 2, and a threshold circuit in FIGURE 3.

These various circuit configurations or building blocks may be usefully employed in numerous applications and devices. For ease in describing and illustrating such applications, the various configurations will first be identified symbolically, according to FIGURES 4A–E.

Figure 4A:
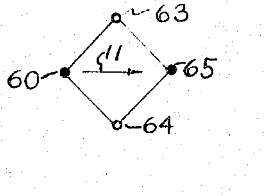
FIGURE 4A is the basic straight-through bridge.

FIGURE 4A shows a straight-through bridge. Current input appearing at terminals 63 and 64 control the circuit and gate it "on" or "off." This current can be gated or continuous. When in the "on" mode, an input signal applied to terminals 60 will effectively transfer to terminal 65, the output terminal. The signal at this point experiences power gain without a change in signal level. It is to be noted that the current terminals have open centers and can therefore be readily distinguished from the voltage terminals which have solid centers throughout all the illustrations.

Figure 4B:
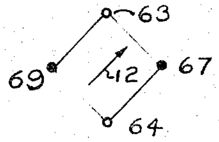
FIGURE 4B is the same circuit with positive offset.
Figure 4C:
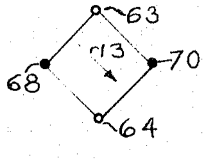
FIGURE 4C shows a circuit similar to 4B but with negative offset.
Figure 4D:
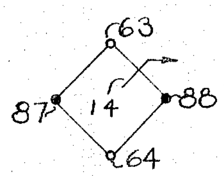
FIGURE 4D is a circuit showing the establishment of a positive threshold.

FIGURE 4B shows a similar circuit; however this circuit introduces a positive offset in the output voltage. That is, the output will now be some prescribed voltage higher than the applied voltage. FIG. 4C shows a circuit with negative offset. Positive and negative offset are indicated by arrows 12 and 13 respectively.

Figure 4E:
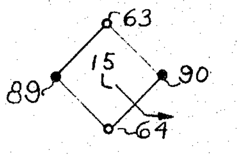
FIGURE 4E is a circuit showing the establishment of a negative threshold.

FIGURE 4D again shows a circuit similar to those preceding. Here, an input voltage applied to terminal 87 is effectively compared with a threshold voltage that may be applied to terminal 88. When the input voltage reaches the level of the threshold voltage a pulse is generated in the collector circuit of the transistor connected between terminals 63 and 88 as indicated by arrow 14. FIGURE 4E shows a circuit generating a pulse as indicated by arrow 15 when a negative voltage is applied to terminal 89.

Using the above symbolic representations, several representative applications will now be described in conjunction with FIGURES 5A–J.

Figure 5A:
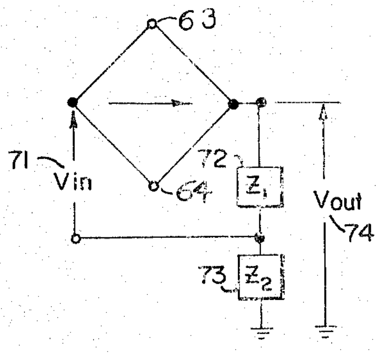
FIGURE 5A shows a basic voltage amplifier.

In FIGURE 5A, a voltage amplifier is shown. $V_{in}$71 is applied to the bridge circuit and impedance $Z_1$72 in series. $V_{out}$74 is taken across both impedance $Z_1$72 and $Z_2$73. A constant current is applied to the bridge at terminals 63 and 64 unless it is desired to have the output gated. The voltage amplification for this circuit is:

$$A_V=\frac{1}{1-\frac{Z_2}{Z_1+Z_2}}$$

The above unit may be used as an A.-C. amplifier or a D.-C. amplifier. In either case feedback is present and a voltage gain greater than unity is obtained. Several other function generators may be provided by this configuration. Using feedback techniques, voltage functions with respect to time can be generated. Further, using variable-offset circuits in which the offset is controlled by feedback from the output level, a variety of useful functions can be generated. For instance, a linear slope generator, a delay circuit, and even a ladder circuit generater can be constructed.

Figure 5B:
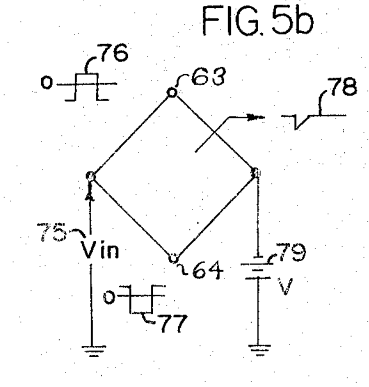
FIGURE 5B shows a threshold detection circuit.

FIGURE 5B shows a threshold detection circuit which functions like a Schmitt trigger. For example, if a constant voltage $V_{in}$75 is applied to the circuit and a fixed voltage V79 applied to the bridge at its usual output terminals, current pulses 76 and 77 applied to the circuit will cause an output 78 to appear only when $V_{in}75>V79$. A very flexible trigger is now available in that the threshold voltage V79 can be readily changed without disturbing the rest of the circuit, a feature not found in conventional Schmitt triggers.

Figure 5C:
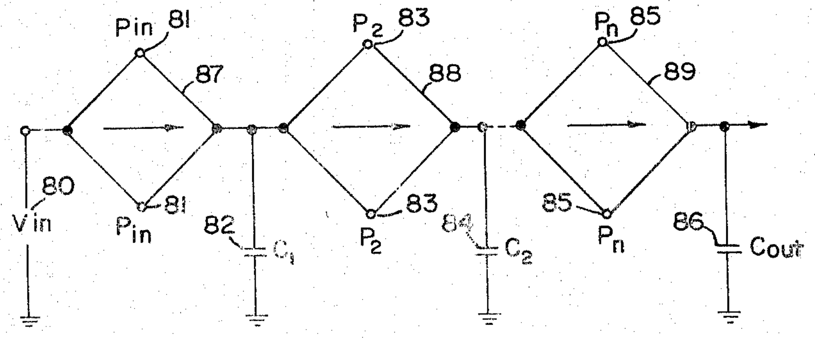
FIGURE 5C is a storage circuit.

In FIGURE 5C a storage system is shown. A voltage input $V_{in}$80 will be transferred any number of units down, provided gates $P_{in}$81 and 83 are switched on. When $P_{in}$81 is switched on, $V_{in}$80 transfers to $C_1$82 and held. When $P_2$83 is switched on, $V_{in}$80, now at $C_1$82, transfers to $C_2$84. When the stored information is desired, $P_n$ and any preceding units must be gated on. Accordingly, when $P_n$85 is switched on, voltage $V_{in}$80 now at $C_2$84 will be transferred to $C_{out}$86.

Figure 5D:
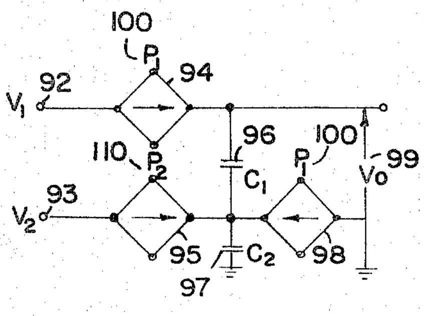
FIGURE 5D represents an analog addition circuit.

FIGURE 5D shows an analog addition system. Assume a signal voltage $V_1$92 is to be added to $V_2$93. Signal $V_1$92 is applied to bridge 94. When bridge 94 and bridge 98 are switched on simultaneously by means of gate pulse $P_1$100, $V_1$92 is transferred to $C_1$96 and held there. When bridge 95 is switched on by means of pulse $P_2$110, $V_2$93 is transferred to $C_2$97. Read out $V_o$99 will be across $C_2$97 and $C_1$96 and will indicate the sum of the two voltages $V_1$92 and $V_2$93.

Figure 5E:
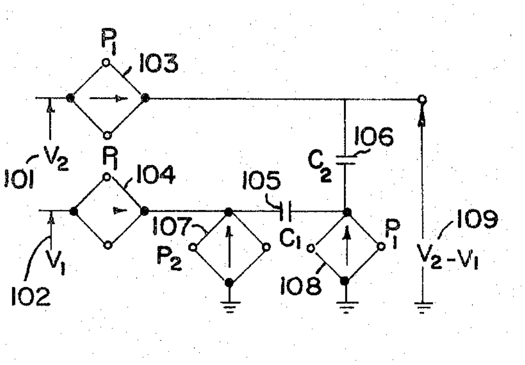
FIGURE 5E is an analog subtraction circuit.

FIGURE 5E shows analog subtraction. $V_2$101 is transferred to $C_2$106 by way of 103. $V_1$102 is transferred to $C_1$ by way of 104. Ground in both instances is transferred to the midpoint of $C_2$106 and $C_1$105 by way of 108. 103, 104 and 108 would be switched on simultaneously by means of a current pulse applied to them individually from a common current source. 107 is then switched on for read-out. $V_2$ is read across $C_2$ in the forward direction and $V_1$ is read across $C_1$ in the negative direction; consequently, 109 indicates the difference in the two signals.

Figure 5F:
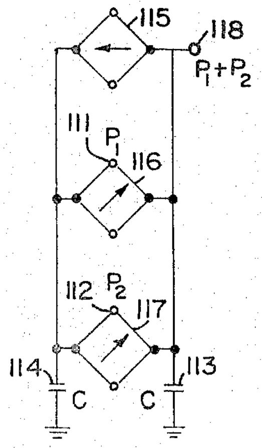
FIGURE 5F is a digital addition circuit.

FIGURE 5F shows digital addition. Assume, for the moment that no voltage appears across C114 or C113. When a pulse $P_1$111 appears at bridge 116, C113 increases its voltage as a result of the offset, indicated by the arrow. If the indicated offset is 1 volt, C113 receives a 1 volt charge. The voltage across C113 is thereupon transferred to C114 by way of bridge 115 which is continuously switched on at prescribed intervals.

If the above pulse $P_1$111 is, by way of example, a train of five pulses, for each of these pulses the capacitor C113 receives a charge one volt greater than C114 due to the offset. Bridge 115 then transfers the increased voltage to C114, raising it to the same voltage as C113. When the next pulse in the train arrives, C113 again is charged one volt higher than C114, but C114 is now at a higher voltage than it was due to the previous pulse. Ultimately, both capacitors become charged to 5 volts.

Likewise, if $P_2$112 is a train of three pulses, the offset of 117, which is identical to that of 116, causes capacitors 113 and 114 to become charged an additional 3 volts. The sum of pulse trains 111 and 112, eight volts, is at 118 for read-out.

Figure 5G:
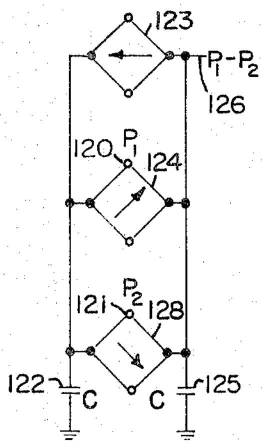
FIGURE 5G is a digital subtraction circuit.

FIGURE 5G shows digital subtraction, with bridge 128 providing a negative offset. That is, when a pulse is applied to 128 form $P_2$121, the voltage across C125 is reduced. Accordingly, bridge 124 will cause capacitors 125 and 122 to charge to 5 volts if the offset is again one volt and $P_1$120 is a train of five pulses. If $P_2$121 is a train of three pulses, bridge 128 will reduce the voltage across C125 and C122 by three volts. Therefore readout 126 will be the difference of these two voltages or two volts in this instance.

Figure 5H:
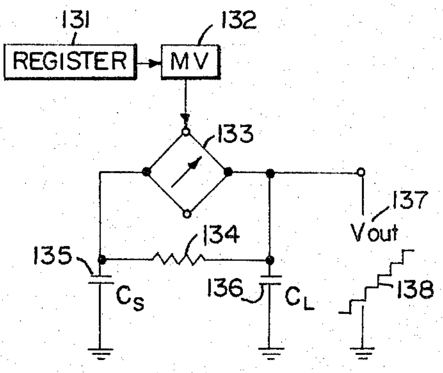
FIGURE 5H is a digital-to-analog converter.

FIGURE 5H shows digital-to-analog conversion. Register 131 causes multivibrator 132 to pulse bridge 133 a prescribed number of times. Again, bridge 133 has an offset. For convenience assume one volt. If the voltage across $C_s$135 and $C_L$136 is zero, bridge 133 will cause $C_L$ to increase its voltage by one volt greater than $C_s$135. However, as $C_L$136 charges up one volt higher, by means of resistor 134, $C_s$135 also charges up to the increased voltage a short while later. The increase continues with each pulse producing an analog output $V_{out}$137 which will appear as waveform 138.

Figure 5J:
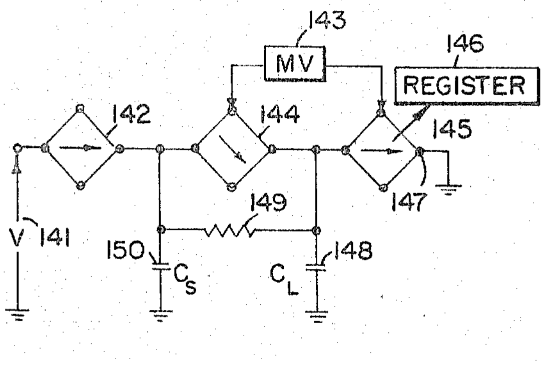
FIGURE 5J is an analog-to-digital converter.

FIGURE 5J shows analog-to-digital conversion. Analog input V141 is applied to bridge 142 and is transferred to $C_s$150. $C_L$148 charges up to the same voltage as $C_s$ by way of resistor 149. Multivibrator 143 switches on 144 and 145 alternately. When 144 is switched on, the voltage across $C_L$148 is reduced one volt. A path to ground for the discharge of the difference in voltage is provided by means of bridge 145. The process continues until the voltage across both capacitors $C_s$150 and $C_L$148 is reduced to zero. The number of times "$n$" that this will occur is:

$$n=\frac{V_{in}141}{\Delta V}$$

where ΔV is the voltage offset of bridge 144. Each time that 145 is switched on and a voltage difference on $C_L$148 passed to ground 147 a positive pulse is generated across the impedance threshold inserted in the collector of 145 as explained earlier and consequently registered at register 146.

The performance of a given transistor network is very much affected by its components. This can be seen by an examination of three formulae:

(1) For speed, $Sp=\frac{P_{ave}}{S}$ (bits second)

(2) For power requirements, $P_{ave}=KS\frac{4V_c^2}{R_o}$ (3) For stability, $S=\frac{1}{(V_s/V_o)+(V_d/V_o)+(V_t/V_o)}$ where; $Sp$=speed; $P_{ave}$=average power; S=stability; K is a constant; $V_c$ the gate supply voltage; $R_o$ the output impedance of the bridge; $V_s$ the change in input voltage due to sampling; $V_o$, the minimum change in output voltage due to sampling, $V_d$ the voltage transfer uncertainty due to variation in emitter base structure; $V_t$, change in output due to discharge in $C_o$, an output capacitor through $R_o$ during time interval T.

The transistor bridge is extremely fast and requires little power. However, if an unusual requirement in one or the other is made, an inspection of the first two formulas indicates one must be sacrificed for the other. Stability is also reflected in the determination of speed and power needs. Stability determines the accuracy of the device and hence is of prime importance. Speed and power requirements can usually be neglected and a very satisfactory device will nevertheless be produced, while concentrating entirely on stability.

From the third formula, stability is determined by three factors. The first is input stability and is indicated by the ratio $V_s/V_o$. This ratio is kept to a minimum by matching the impedance placed across the input terminals with that of an impedance placed across the output terminals. In practice, this factor is of little significance.

The second factor affecting overall stability is offset stability and is indicated by the ratio $V_d/V_o$. With a proper selection of matched transistors, this ratio can be kept to a minimum. In practice, with little effort one millivolt has been achieved. It will be noted that this is the most significant factor of the three. However, it may have a positive or negative value and when one or more bridges are tied together is self canceling.

The last factor to be considered is storage stability and is indicated by the ratio of $V_t/V_o$. This latter factor is the result of leakage from the output capacitor and is a function of $C_o$, $R_o$ and time T. This factor can be kept small by increasing $R_o$ which is easily done by selecting silicon transistors. Furthermore, it can also be reduced by a proper design in holding time and an appropriate selection of the size of capacitor $C_o$. Again this latter factor is relatively small and can be optimized in design.

Many digital systems have been illustrated utilizing the present invention. Such illustrations are merely representative of the diverse uses of my invention in a variety of systems.

I claim as my invention:

1. A bridge network comprising,
input means,
output means,
four transistors,
two of which are NPN transistors, and
two of which are PNP transistors,
a first group of said transistors comprising an NPN transistor and a PNP transistor having their bases connected together,
a second group of said transistors comprising an NPN transistor and a PNP transistor having their emitters connected together, said first group of interconnected transistors having their emitters connected to the bases of said second group of interconnected transistors,
positive and negative biasing means,
said PNP transistors having said negative bias applied to its collectors,
said NPN transistors having said positive bias applied to its collectors,
current generating means for gating said transistors on and off having first and second leads,
said first lead of said current generating means connected to one point of connection between said first and second group of transistors,
said second lead of said current generating means connected to the second point of connection between the first and second group of transistors,
said input means connected to said base connections of said first group of transistors, said output means connected to said emitter connection of said second group of transistors.

2. A transistor bridge according to claim 1 wherein said current generating means is two symmetrical current sources connected in series with the midpoint connection between said symmetrical current sources grounded,
said symmetrical current sources being so arranged as to be of instantaneous opposite polarity, with respect to ground,
said current sources having a regulation of at least plus or minus one percent.

3. A transistor bridge network according to claim 2 which further includes,
an input impedance having first and second leads,
said first lead of said input impedance connected to the point of connection between the bases of said first group of interconnected transistors,
said second lead of said output impedance connected to ground,
an output impedance having first and second leads,
said first lead of said output impedance connected to the point of connection between the emitters of said second group of interconnected transistors,
said second lead of said output impedance connected to ground,
said input and output impedance being substantially identical.

4. A transistor bridge network according to claim 3 which further includes two rectifiers in the emitter circuit in series with two similar in type transistors whereby the output will be offset a predetermined increment from the input.

5. A transistor bridge network according to claim 4 which further includes an impedance inserted in the collector circuit of a preselected transistor whereby thresholds can be detected.

References Cited by the Examiner

UNITED STATES PATENTS

| | | | |
|---|---|---|---|
| 2,860,193 | 11/1958 | Lindsay | 330—17 X |
| 2,955,257 | 10/1960 | Lindsay | 330—17 X |
| 3,077,545 | 2/1963 | Rywak | 307—88.5 |
| 3,098,200 | 7/1963 | Jensen | 330—15 X |
| 3,155,837 | 11/1964 | Doyle | 307—88.5 |
| 3,157,839 | 11/1964 | Brown | 330—146 X |
| 3,175,211 | 3/1965 | Lee et al. | |

OTHER REFERENCES

Baker et al.: "The Diamond Circuit," Technical Report No. 300, Lincoln Laboratory, January 30, 1963.

ROY LAKE, *Primary Examiner.*

R. P. KANANEN, J. B. MULLINS, *Assistant Examiners.*